US010191240B2

(12) United States Patent
Mitani et al.

(10) Patent No.: US 10,191,240 B2
(45) Date of Patent: Jan. 29, 2019

(54) LENS BARREL

(71) Applicant: KONICA MINOLTA, INC., Chiyoda-ku (JP)

(72) Inventors: Yoshifumi Mitani, Osaka (JP); Tomohiro Matsumoto, Sakai (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/996,729

(22) Filed: Jan. 15, 2016

(65) Prior Publication Data

US 2016/0209617 A1    Jul. 21, 2016

(30) Foreign Application Priority Data

Jan. 20, 2015    (JP) .................................. 2015-008525

(51) Int. Cl.
| G02B 7/04 | (2006.01) |
| G02B 7/02 | (2006.01) |
| G03B 17/14 | (2006.01) |

(52) U.S. Cl.
CPC .............. *G02B 7/023* (2013.01); *G02B 7/025* (2013.01); *G02B 7/04* (2013.01); *G03B 17/14* (2013.01)

(58) Field of Classification Search
CPC .......... G02B 7/023; G02B 7/025; G02B 7/04; G03B 17/14
USPC ......................................................... 359/823
See application file for complete search history.

(56) References Cited

U.S. PATENT DOCUMENTS

| 6,909,558 B2* | 6/2005 | Orimo ................... G02B 7/023 353/101 |
| 2005/0111116 A1* | 5/2005 | Okajima ................. G02B 7/04 359/819 |
| 2011/0013296 A1* | 1/2011 | Kazahaya ............... G02B 7/08 359/819 |
| 2011/0096420 A1 | 4/2011 | Sato | |

FOREIGN PATENT DOCUMENTS

| JP | 2008-216906 | 9/2008 |
| JP | 2010-066720 | 3/2010 |
| JP | 2011-022461 | 2/2011 |
| JP | 2011-095324 | 5/2011 |
| JP | 2013-238792 | 11/2013 |

OTHER PUBLICATIONS

Office Action (and an English translation) dated Aug. 7, 2018 which issued in the corresponding Japanese Patent Application No. 2015-008525.

* cited by examiner

*Primary Examiner* — Joseph P Martinez
*Assistant Examiner* — Vipin Patel
(74) *Attorney, Agent, or Firm* — Cozen O'Connor

(57) ABSTRACT

In a lens barrel of the present invention, a frame body holding an optical element is held in a frame body holding member, includes an adjuster for adjusting the position of the frame body with respect to a predetermined axis of the frame body holding member so as to be able to adjust at least one of the orientation of an optical axis in the optical element and the position of the optical element in a direction of the optical axis, and the adjuster is arranged at a position adjustable from an opening portion of a mounting member to be mounted on the frame body holding member.

16 Claims, 14 Drawing Sheets

LENS BARREL

TECHNICAL FIELD

The present invention relates to a lens barrel.

BACKGROUND ART

In recent years, qualities required for lens barrels have been increased and both high performances and high reliability have been required. In terms of optical performances, an adjuster for adjusting the position of a lens and the like is provided in many cases to enhance description performance. A lens barrel capable of adjusting the eccentricity and inclination of an optical element with respect to an optical axis is disclosed, for example, in JP2013-238792A (patent literature 1). An adjusting mechanism disclosed in this patent literature 1 is such that eccentricity adjustment roller mounting portions for adjusting the eccentricity of a fourth length group holding frame and inclination adjustment roller mounting portions for adjusting the inclination of the fourth length group holding frame are both provided at three positions spaced apart in a circumferential direction on the outer periphery of the fourth lens group holding frame (frame body) arranged on a side closest to an image and the eccentricity and inclination are made adjustable by rotating eccentricity adjustment rollers mounted in the eccentricity adjustment roller mounting portions and inclination adjustment rollers mounted in the inclination adjustment roller mounting portions. By fixing a mount member as a mounting member on which a camera main body is to be mounted to a fixing cylinder as a frame body holding member holding the fourth lens group holding frame via an exterior ring by screws after those adjustments, the eccentricity adjustment rollers mounted in the eccentricity adjustment roller mounting portions and the inclination adjustment rollers mounted in the inclination adjustment roller mounting portions are covered over by the mount member and the exterior ring.

However, in the above literature 1, the mount member as the mounting member is fixed to the fixing cylinder after the eccentricity adjustment and the inclination adjustment of the fourth lens group holding frame are made by rotating the eccentricity adjustment rollers and the inclination adjustment rollers. Thus, the position of the fourth lens group holding frame (lens) and the like already adjusted may vary due to a distortion of a member and the like in fixing the mount member, resulting in performance degradation.

SUMMARY OF INVENTION

The present invention was developed in view of the above situation and aims to provide a lens barrel enabling at least one of the orientation of an optical axis in an optical element with respect to a predetermined axis of a frame body holding member and the position of the optical element in an optical axis direction to be adjusted after a mounting member is mounted and capable of reducing an error occurring after the adjustment and enabling a highly accurate adjustment.

In a lens barrel according to the present invention, a frame body holding an optical element is held in a frame body holding member and includes an adjuster for adjusting the position of the frame body with respect to a predetermined axis of the frame body holding member so as to be able to adjust at least one of the orientation of an optical axis in the optical element and the position of the optical element in a direction of the optical axis, and the adjuster is arranged at a position adjustable from an opening portion of a mounting member to be mounted on the frame body holding member. Such a lens barrel enables at least one of the orientation of the optical axis in the optical element with respect to the frame body holding member and the position of the optical element in the optical axis direction to be adjusted after the mounting member is mounted, can reduce an error occurring after the adjustment and enables a highly accurate adjustment.

These and other objects, features and advantages of the present invention will become more apparent upon reading the following detailed description along with the accompanying drawings.

DESCRIPTION OF EMBODIMENT

Hereinafter, embodiments according to the present invention are described based on the drawings. Note that components denoted by the same reference signs in the respective drawings are the same components and the description thereof is omitted as appropriate. In this specification, components are denoted by reference signs without suffixes when being collectively called while being denoted by reference signs with suffixes when being individually denoted.

Figure 1:
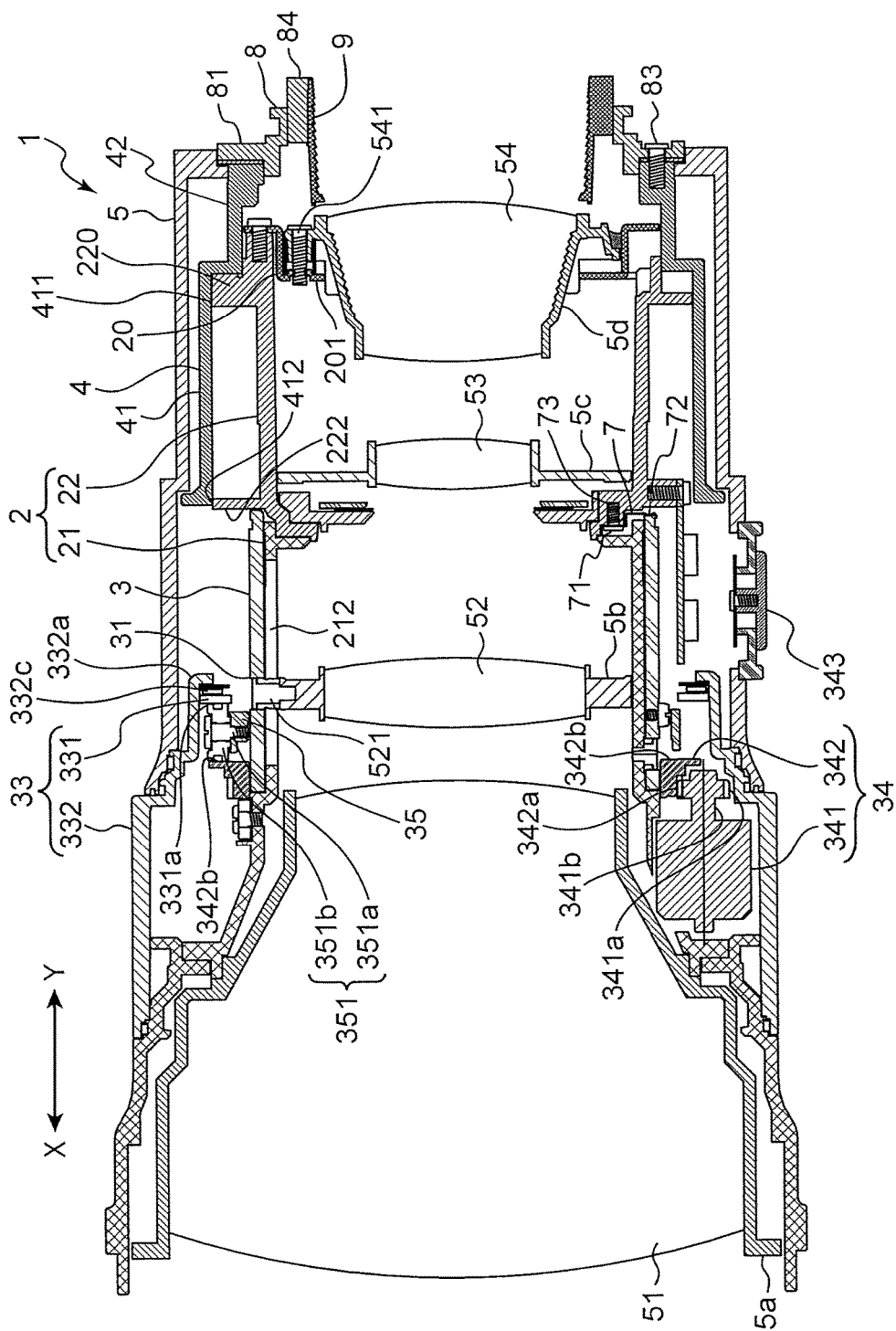
FIG. 1 is a sectional view of a lens barrel in a first embodiment.
Figure 2:
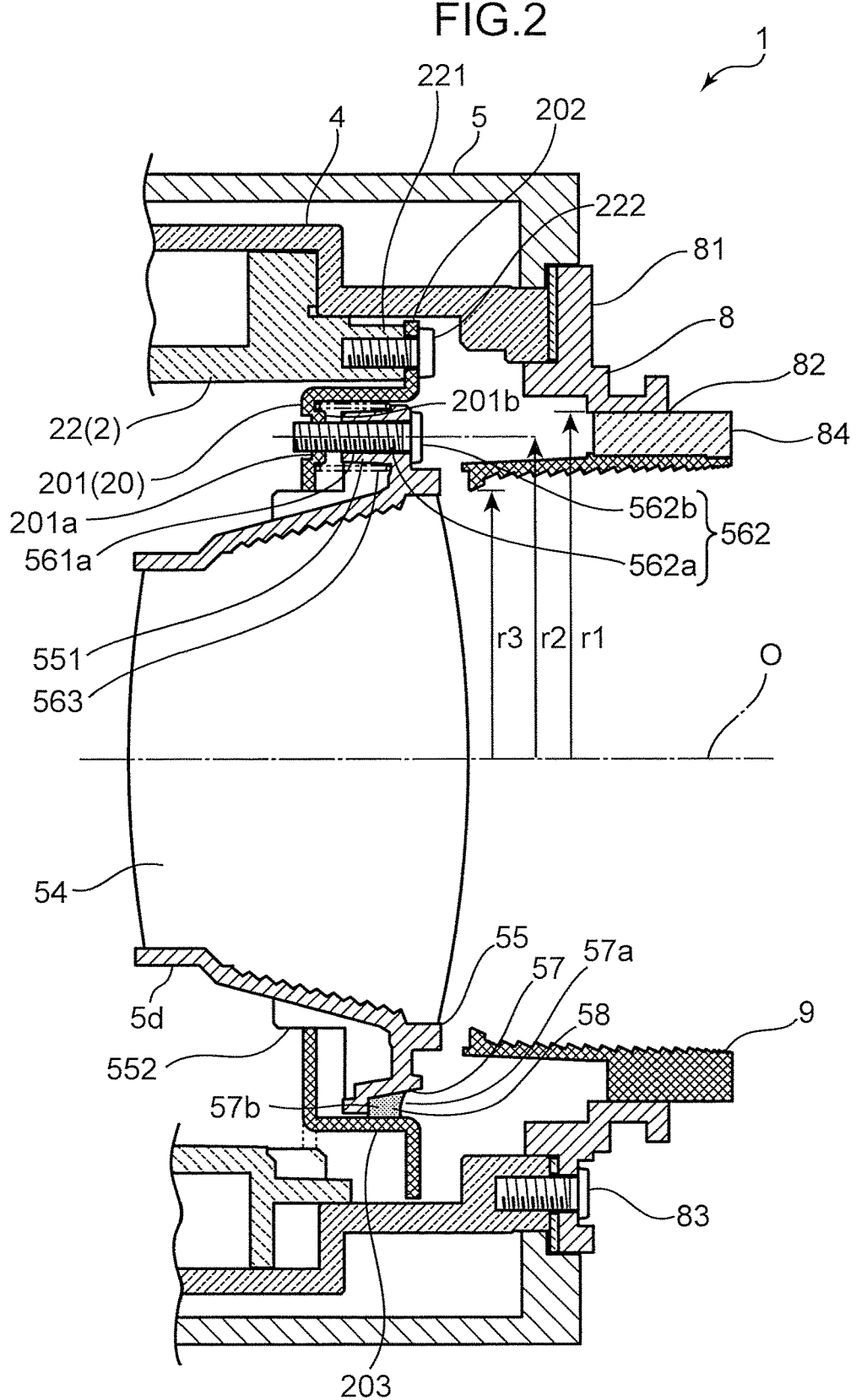
FIG. 2 is an enlarged sectional view of an essential part of the lens barrel shown in FIG. 1.
Figure 3:
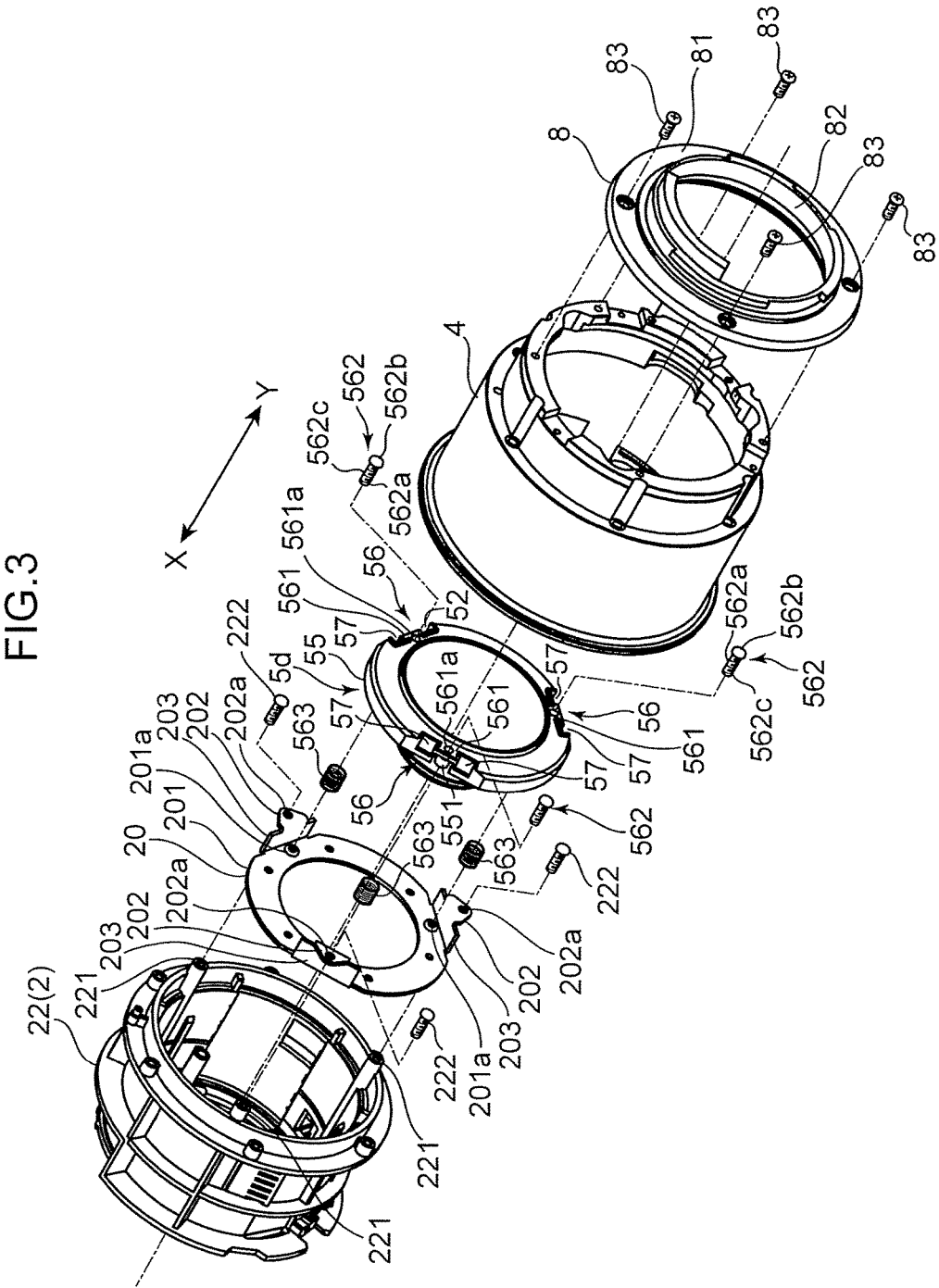
FIG. 3 is an exploded perspective view of the essential part of the lens barrel shown in FIG. 2 with a part omitted.

FIG. 1 is a sectional view of a lens barrel in a first embodiment. FIG. 2 is an enlarged sectional view of an essential part of the lens barrel shown in FIG. 1. FIG. 3 is an exploded perspective view of the essential part of the lens barrel shown in FIG. 2 with a part omitted. Note that, in the following description, an X-direction shown is a direction toward an object side and a Y-direction shown is a direction toward an image side.

The lens barrel 1 of the first embodiment includes a frame body holding member 2, 20, a cam cylinder 3, a mount member (mounting member) 8, a cover member 9, and lens group holding frames 5a to 5d holding lens groups 51 to 54 as shown in FIG. 1.

The frame body holding member includes a fixing cylinder (holding member main body) 2 and a frame supporting portion 20 holding the fourth lens group holding frame (frame body) 5d to be described later out of the lens group holding frames 5a to 5d.

The fixing cylinder 2 includes a hollow cylindrical first fixing cylinder 21 made of metal and a hollow cylindrical second fixing cylinder 22 made of synthetic resin and fixedly coupled to an image-side end part of the first fixing cylinder 21.

The first fixing cylinder 21 includes a guide groove 212 extending in an axial direction and formed to penetrate from the inner periphery to the outer periphery.

The second fixing cylinder 22 includes frame mounting portions 221, on which the frame supporting portion 20 is to be mounted, on an image-side end surface in the axial direction as shown in FIGS. 2 and 3. In this embodiment, the frame mounting portion 221 is a screw hole with which a mounting bolt 222 is to be threadably engaged. The second fixing cylinder 22 of this embodiment is fixedly coupled to a substantially hollow cylindrical reinforcing member 4 made of metal by bolts (not shown) while being housed on the inner periphery of the reinforcing member 4. Note that the reinforcing member 4 of this embodiment has the outer periphery covered by an exterior member 5 arranged on an outer peripheral side (exterior member 5 is not shown in FIG. 3).

The frame supporting portion 20 includes a frame supporting portion main body 201 formed of a plate-like annular body, a plurality of (three in this embodiment) main body mounting pieces (main body mounting portions) 202 for mounting the frame supporting portion main body 201 on the second fixing cylinder 22 and coupling portions 203 coupling the frame supporting portion main body 201 and the main body mounting pieces 202. The frame supporting portion 20 is preferably formed of a metal pressed member to ensure space saving and strength, but may be formed of a resin molded member.

The frame supporting portion main body 201 is formed to have such an outer diameter as to be insertable into the inner periphery of the second fixing cylinder 22 and includes three screw holes (engaged portions) 201a arranged at circumferentially equal intervals.

Figure 4:
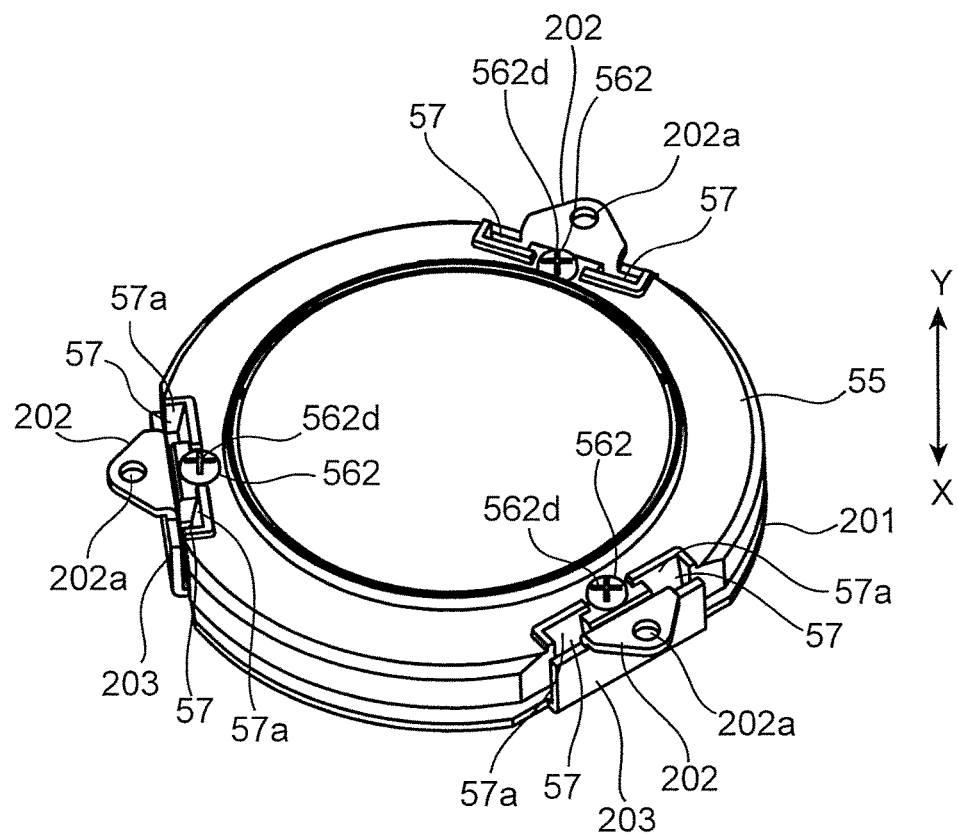
FIG. 4 is a perspective view of a state where a fourth lens group holding frame and a frame supporting portion used in the lens barrel shown in FIG. 1 are assembled.

The main body mounting pieces 202 are arranged at three positions equally spaced apart along a circumferential direction of the frame supporting portion main body 201 and each thereof includes a circular bolt insertion hole 202a into which the mounting bolt 222 is to be inserted. As shown in FIG. 4, the coupling portions 203 of the respective main body mounting pieces 202 at the three positions are arranged in D-cut spaces formed on the outer periphery of the frame body. In this way, a reduction in the diameter of the fixing cylinder main body located at the outer side is realized. FIG. 4 is a perspective view of a state where the fourth lens group holding frame and the frame supporting portion used in the lens barrel shown in FIG. 1 are assembled.

Figure 5:
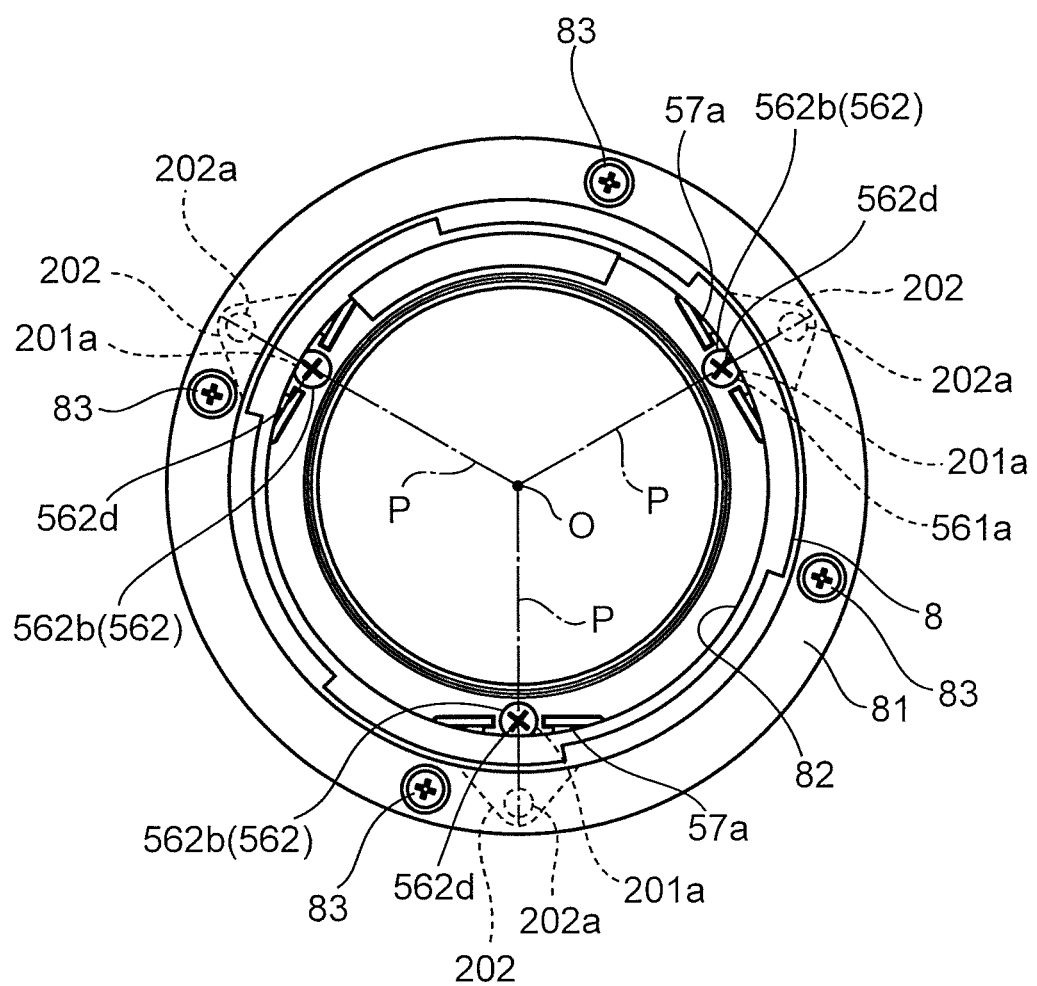
FIG. 5 is a view of an opening portion of a mount member used in the lens barrel shown in FIG. 1 when viewed in an optical axis direction.

As shown in FIG. 5, the main body mounting piece 202 is so formed that the screw hole 201a is located on an extension line p extending from a center O of the frame supporting portion main body 201 to the main body mounting piece 202 (bolt insertion hole 202a in this embodiment) when viewed in an optical axis direction (X-Y direction). FIG. 5 is a view of an opening portion of the mount member used in the lens barrel shown in FIG. 1 when viewed in the optical axis direction.

As shown in FIG. 2, the coupling portion 203 extends a predetermined length toward the image side along an axial direction of the frame supporting portion main body 201 (optical axis direction) from the outer peripheral edge of the frame supporting portion main body 201. In this embodiment, the coupling portions 203 are bent toward the image side from the outer periphery edge of the frame supporting portion main body 201 and the main body mounting pieces 202 are bent radially outwardly of the frame supporting portion main body 201 from an image-side end part of the coupling portion 203, whereby the frame supporting portion main body 201, the main body mounting pieces 202 and the coupling portions 203 are integrally formed.

The frame supporting portion 20 thus configured is mounted on the image-side end surface of the second fixing cylinder 22 by inserting the frame supporting portion main body 201 into the inner periphery of the second fixing cylinder 22 from the image side, inserting the mounting bolts 222 into the bolt insertion holes 202a of the main body mounting pieces 202 and threadably engaging the inserted mounting bolts 222 with the frame mounting portions 221 of the second fixing cylinder 22 as shown in FIGS. 1 and 2.

Next, the mount member 8 is described. The mount member 8 is a member for detachably mounting this lens barrel 1 on a camera main body (not shown, another member) and includes an opening portion 82 formed in a central part and a reference surface (reference portion) 81 on which the camera main body is to be mounted.

The opening portion 82 is formed to penetrate from the object side toward the image side in the central part of the mount member 8 and allow light to pass in the optical axis direction, and can guide light having passed through the lens groups 51 to 54 to the camera main body. An electrical contact portion 84 for electrically connecting this lens barrel 1 and the camera main body and transmitting information in the form of an electrical signal between the lens barrel 1 and the camera main body is attached to the opening portion 82.

The reference surface 81 is formed substantially over the entire circumference on an image side end surface of the mount member 8.

The mount member 8 is fixedly mounted on the reinforcing member 4 by fixing bolts 83. In this way, the mount member 8 is fixed to the second fixing cylinder 22 via the reinforcing member 4.

The cover member 9 has a substantially hollow cylindrical shape and an inner diameter thereof is of such a size as to be able to cover the opening portion 82 of the mount member 8 except an optically used range. This cover member 9 is so mounted that the outer periphery is fitted in the inner periphery of the mount member 8.

Although the mounting member (mount member) is used by being connected to the camera main body in this embodiment, a member to be mounted on the mounting member may be a fixing member including at least another optical element different from an optical element held by the frame body.

Also in this configuration, it is possible to adjust adjusters from an opening portion of a mounting member with the mounting member mounted. It is possible to adjust the position of the optical element held by the frame body with respect to a predetermined axis of a fixing cylinder. It is possible to prevent positional displacement of the optical element with respect to a reference portion due to a distortion of a part caused by the mounting of the mounting member and an error of the mounting member itself. Therefor, it is possible to adjust the position of the optical element held by the frame body with high accuracy. Thus, the position of the optical element can be more precisely adjusted also with respect to the fixing member mounted on the basis of the reference portion of the mounting member.

Next, the cam cylinder 3 is described. The cam cylinder 3 is a member for moving the lens group in the optical axis direction. In this embodiment, the cam cylinder 3 moves the second lens group 52 in the optical axis direction. The cam cylinder 3 is composed of a hollow cylindrical body and includes a cam groove 31 into which guiding shafts 521 of the second lens group 52 are movably fitted as shown in FIG. 1. This cam groove 31 is formed obliquely to the axial direction. The cam cylinder 3 thus formed is held on a part of the outer periphery of the first fixing cylinder 21 on the image side, immovably in the axial direction and rotatably about the optical axis (about the axis of the first fixing cylinder 21).

In this embodiment, the lens group holding frames includes the first lens group holding frame 5a, the second lens group holding frame 5b, the third lens group holding frame 5c and the fourth lens group holding frame (frame body) 5d successively arranged from the object side to the image side.

The first lens group holding frame 5a holds the first lens group 51 including one or more lenses (optical element) and is fixedly held in the first fixing cylinder 21.

The second lens group holding frame 5b holds the second lens group 52 including one or more lenses and is held in the first fixing cylinder 21, movably in the optical axis direction (X-Y direction, axial direction of the first fixing cylinder 21). This second lens group holding frame 5b includes, on the outer periphery, the guiding shafts 521 movably fitted into the guide groove 212 of the first fixing cylinder 21 and the cam groove 31 of the cam cylinder 3, and the second lens group 52 moves in the optical axis direction by guiding and moving these guiding shafts 521 along the guide groove 212 and the cam groove 31 with the rotation of the cam cylinder 3. More specifically, in the lens barrel 1, the cam cylinder 3 is rotated by a rotating member 33, 34 and 35 for rotating the cam cylinder 3 and the second lens group 52 moves in the optical axis direction with that rotation of the cam cylinder 3. The rotating member of this embodiment includes a manual operating member 33, an autofocus operating member 34 and an output ring 35.

The autofocus operating member 34 includes an autofocus motor 341 held in the first fixing cylinder 21 and an automatic input ring 342 interlockably coupled to the autofocus motor 341 via a gear.

The autofocus motor 341 includes an output shaft 341b with a first gear 341a in this embodiment.

The automatic input ring 342 is composed of a hollow cylindrical member and includes, on the outer periphery, a second gear 342a meshed with the first gear 341a of the output shaft 341. The automatic input ring 342 includes a first roller rolling portion 342b, on which rolling rollers 351b of the output rings 35 to be described later roll, on an image-side surface thereof. The automatic input ring 342 is arranged on the outer periphery of the first fixing cylinder 21, rotatably about the axis of the first fixing cylinder 21.

The manual operating member 33 is for manually rotating the cam cylinder 3 and includes a manual input ring 331 and a manual operation ring 332 for operating the manual input ring 331. The manual input ring 331 is in the form of a ring plate and includes a second roller rolling portion 331a, on which the rolling rollers 351b of the output ring 35 to be described later roll, on an object-side surface thereof.

This manual input ring 331 is arranged at a predetermined distance from the automatic input ring 342 and at an image side of the automatic input ring 342, rotatably about the axis of the first fixing cylinder 21.

The manual operation ring 332 is in the form of a hollow cylinder and includes an operating portion 332a composed of an integrally formed flange on an inner peripheral side. This operating portion 332a operates the manual input ring 331 via an input ring biasing spring 332c from the image side.

The output ring 35 is composed of a hollow cylindrical member. Three (only one is shown in FIG. 1) interlocking member 351 held on the output ring 35 are attached to the output ring 35.

The interlocking members 351 are members for interlocking the output ring 35 and the automatic input ring 342 and interlocking the output ring 35 and the manual input ring 331 and each thereof includes a roller shaft 351a and the rolling roller 351b rotatably supported on the roller shaft 351a.

The output ring 35 is coupled to the cam cylinder 3 by an unillustrated coupling member. The output ring 35 is arranged rotatably about the axis of the first fixing cylinder 21 (about the optical axis) between the automatic input ring 342 and the manual input ring 331 in the axial direction of the first fixing cylinder 21 and on an outer peripheral side of the first fixing cylinder 21.

In this state, the rolling rollers 351b are arranged between the first roller rolling portion 342b of the automatic input ring 342 and the second roller rolling portion 331a of the manual input ring 331 and sandwiched between the both in a pressed state by the input ring biasing spring 332c.

In the case of moving the second lens group 52 by the autofocus operating member 34, an autofocus switch 343 provided on the lens barrel 1 is turned on. This causes the autofocus motor 341 to operate.

With this operation of the autofocus motor 341, the automatic input ring 342 meshed with the first gear 341a rotates. With this rotation, the rolling rollers 351b roll on the first roller rolling portion 342b. At that time, since the rolling rollers 351b are sandwiched between the first roller rolling portion 342b and the second roller rolling portion 331a of the manual input ring 331 and the rotation of the manual input ring 331 is regulated by a biasing force of the input ring biasing spring 332c and the like, the rolling rollers 351b revolve around the first fixing cylinder 21 while rotating, whereby the output ring 35 holding the rolling rollers 351b rotate.

With that rotation of the output ring 35, the cam cylinder 3 rotates. By the rotation of the cam cylinder 3, the guiding shafts 521 inserted in each of the guide groove 212 of the first fixing cylinder 21 and the cam groove 31 of the cam cylinder 3 move in those grooves 212, 31, whereby the second lens group 52 moves in the optical axis direction of the first fixing cylinder 21.

On the other hand, the manual operation ring 332 is manually operated in a state where the autofocus switch 343 is turned off. This causes the manual input ring 331 to rotate, whereby the rolling rollers 351b roll on the second roller rolling portion 331a. At that time, since the automatic input ring 342 sandwiching the rolling rollers 351b is meshed with the autofocus motor 341 and cannot rotate, the rolling rollers 351b revolve around the first fixing cylinder 21 while rotating and the entire output ring 35 rotates. Thereafter, the cam cylinder 3 can rotate to drive the second lens group 52 in the optical axis direction of the first fixing cylinder 21 in a manner as described above.

The third lens group holding frame 5c holds the third lens group 53 including one or more lenses and is fixedly held in the second fixing cylinder 22.

The fourth lens group holding frame (frame body) 5d includes a tubular frame main body portion 55 holding the fourth lens group 54 including one or more lenses and adjusters 56 for adjusting the inclination of the optical axis direction in the fourth lens group 54 and the position of the fourth lens group 54 in the optical axis direction as shown in FIGS. 2 and 3.

In this embodiment, the adjusters 56 are arranged at three positions equally spaced apart in a circumferential direction of the frame main body portion 55. Each adjuster 56 includes an engaging member holding portion 561 formed on the frame main body portion 55, a bolt-like engaging member 562 held in the engaging member holding portion 561 and a biasing member 563 for biasing the frame main body portion 55. Note that the adjusters 56 have only to be able to adjust at least one of the inclination of the optical axis direction in the fourth lens group 54 and the position of the fourth lens group 54 in the optical axis direction and can be appropriately changed.

The engaging member holding portion 561 includes an engaging member insertion hole 561a formed to penetrate through a part of the frame main body portion 55 in the optical axis direction. As shown in FIG. 2, this engaging member insertion hole 561a is so formed that a pitch radius r2 from a center O of the frame main body portion 55 is smaller than a radius r1 of the opening portion 82 of the mount member 8 and larger than a radius r3 of a smallest part of the cover member 9.

The engaging member 562 includes a shaft portion 562a and a head portion 562b. The shaft portion 562a is formed to have such a diameter as to be insertable into the engaging member insertion hole 561a and includes, on the outer periphery thereof, an externally threaded portion 562c to be threadably engaged with the screw hole 201a of the frame supporting portion main body 201.

The head portion 562b is formed to have a larger diameter than the engaging member insertion hole 561a and includes, on the tip, an operating portion 562d (see FIG. 5) for rotating the engaging member 562 by being disengageably engaged with a tool.

This operating portion 562d is located radially inwardly of the opening portion 82 of the mount member 8 when viewed from the image side in the optical axis direction as shown in FIG. 5 and can be operated from the opening portion 82 of the mount member 8.

Figure 6:
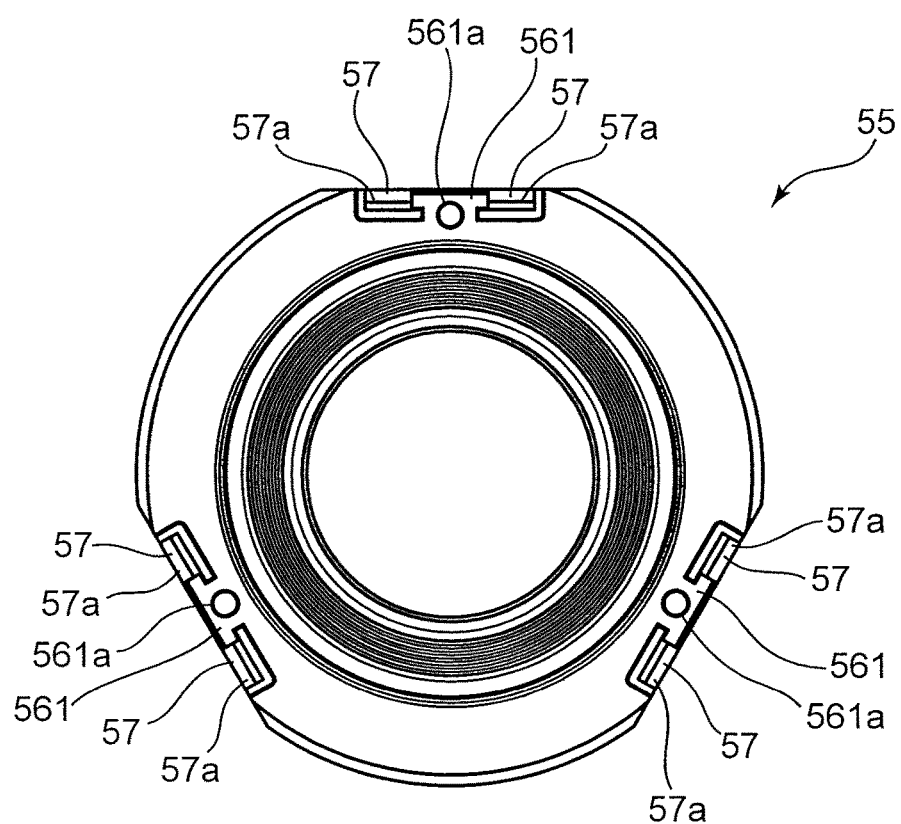
FIG. 6 is a rear view of a frame main body portion used in the lens barrel shown in FIG. 1.
Figure 7:
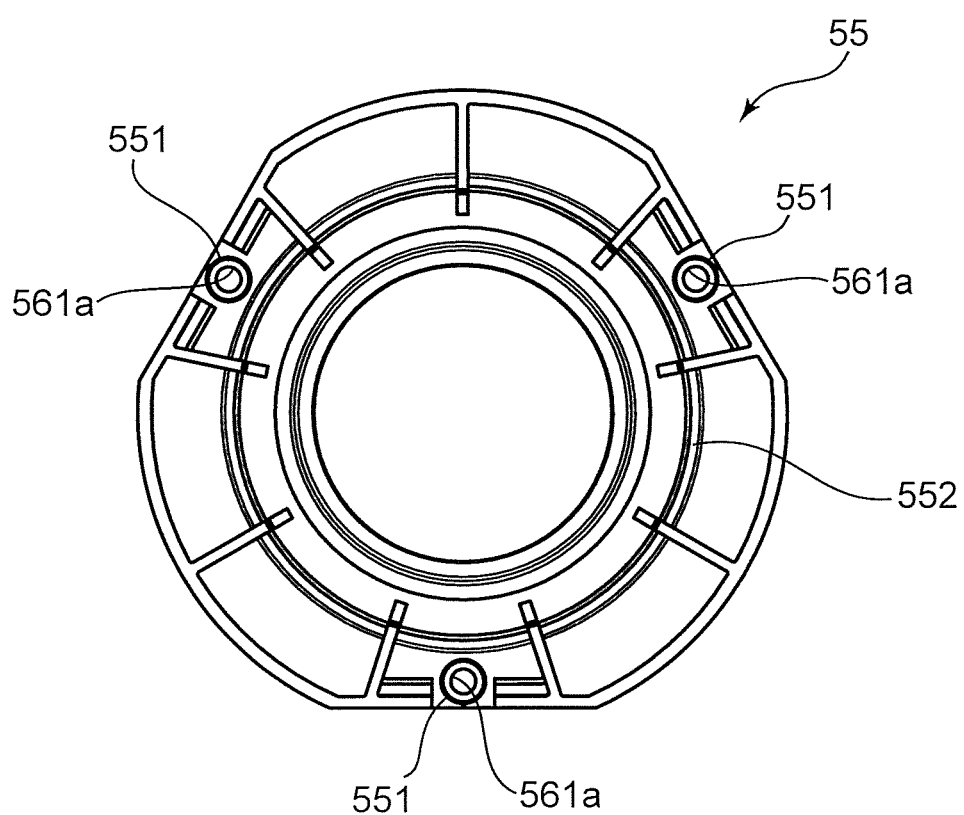
FIG. 7 is a front view of the frame main body portion used in the lens barrel shown in FIG. 1.

As shown in FIGS. 2 and 3, the biasing member 563 is composed of a coil spring of a size capable of receiving a biasing member inserting portion 551 provided on the frame main body portion 55 in an inner peripheral part. The biasing member 563 is arranged with the biasing member inserting portion 551 provided on the frame main body portion 55 inserted in the inner periphery. More specifically, as shown in FIGS. 6 and 7, the frame main body portion 55 includes the hollow cylindrical biasing member inserting portion 551 having such an outer diameter as to be insertable into the inner periphery of the biasing member 563 and projecting toward the object side from the frame main body portion 55 to surround the engaging member insertion hole 561a. FIG. 6 is a rear view of the frame main body portion used in the lens barrel shown in FIG. 1 and FIG. 7 is a front view of the frame main body portion. The biasing member inserting portion 551 is inserted into the inner periphery of the biasing member 563, one end of the biasing member 563 on the image side in the axial direction is held in position and in contact with the frame main body portion 55 and the other end is in contact with a peripheral part of the screw hole 201a of the frame supporting portion main body 201. In this way, the biasing member 563 constantly biases the frame main body portion 55 toward the image side in the optical axis direction with respect to the frame supporting portion main body 201.

A projection 201b is formed to be insertable into the inner periphery of the biasing member 563 on the entire circumference of the screw hole 201a on a side surface of the frame body. One end of the biasing member 563 is held in position by the engagement of the inner periphery of the biasing member 563 with the outer periphery of the projection 201b. By the contact of the projection 201b and the frame main body portion 55, the projection 201b doubles as a mechanical contact position on an adjustment range end. In this embodiment, by providing the mechanical contact position on the same axis as the adjuster 56, the deformation of the frame supporting portion 20 is suppressed to a minimum level when the engaging member 562 is rotated to an adjustment end. The mechanical contact position is preferably provided at a position near the adjuster 56 as in this embodiment, but may not be on the same axis as the adjuster 56.

The adjusters 56 thus configured adjust the orientation (inclination) of an axis (optical axis) in the fourth lens group holding frame 5d (fourth lens group 54), for example, by rotating one or more of the three engaging members 562. Further, all the three engaging members 562 are rotated by the same amount, whereby the fourth lens group holding frame 5d (fourth lens group 54) moves in the optical axis direction to adjust the position in the optical axis direction. Note that the head portions 562d of the engaging members 562 may be bonded so as not to rotate relative to the frame supporting portion main body 201 after the adjustment.

The fourth lens group holding frame 5d of this embodiment includes adhesive portions 57 formed adjacent to the adjusters 56 near the opposite sides of the adjusters 56 in the circumferential direction of the frame main body portion 55.

The adhesive portions 57 of this embodiment include adhesive filling portions 57b for filling an adhesive 58. The adhesive filling portions 57b are formed by recessing parts of both ends of the adjusters 56 in the circumferential direction of the frame main body portion 55 radially inwardly of the frame main body portion 55 to have a predetermined depth in the optical axis direction from an image-side end surface of the frame main body portion 55 and include an adhesive filling opening 57*a* on the image-side end surface side of the frame main body portion 55.

Note that the adhesive portions 57 are preferably as close to the adjusters 56 as possible, but may be on radially outer sides of the adjusters 56 if being located near the adjusters. Further, a plurality of the adhesive portions 57 may be provided. For example, one adhesive portion 57 may be provided radially outwardly of the adjuster 56, but the adjusters 56 and the main body mounting portion 202 are more distanced from each other to enlarge the fixing cylinders in diameter in order to ensure a space for the adhesive filling portions 57*b* in the case of arranging the adhesive portions 57 adjacent to the adjusters 56 in the radial direction as in this embodiment. Thus, in this embodiment, a reduction in the diameters of the fixing cylinders is realized by arranging the adhesive portions 57 adjacent to the adjusters 56 in the circumferential direction as described above.

As shown in FIG. 5, the adhesive filling openings 57*a* are also located radially inwardly of the opening portion 82 of the mount member 8 when viewed from the image side in the optical axis direction and the adhesive 58 can be filled into the adhesive filling openings 57*a* from the opening portion 82 of the mount member 8.

As shown in FIG. 4, outer peripheral sides of the adhesive filling portions 57*b* are covered by the coupling portions 203 of the frame supporting portion main body 201 when the fourth lens group holding frame 5*d* is engaged with the frame supporting portion main body 201 of the frame supporting portion 20 of the fixing cylinder by the engaging members 562.

Next, the operation of the adjusters 56 is described. In a state where the fourth lens group holding frame 5*d* is engaged with the frame supporting portion main body 201 of the frame supporting portion 20 of the fixing cylinder by the engaging members 562 of the adjusters 56 and the mount member 8 is fixed to the second fixing cylinder 22 via the reinforcing member 4, the engaging members 562 are rotated, for example, on the basis of the reference surface 81 of the mount member 8 to adjust the orientation (inclination) of the optical axis in the fourth lens group 54 held in the fourth lens group holding frame 5*d* with respect to the reference surface 81 and the position of the fourth lens group 54 in the optical axis direction.

This adjustment is made by engaging a tool with the operating portions 562*d* of the engaging members 562 from the opening portion 82.

After the adjustment is finished, the adhesive 58 is filled into the adhesive filling openings 57*a* from the opening portion 82 of the mount member 8. Since the filling of the adhesive 58 is also performed from the opening portion 82, it can be performed with the mount member 8 mounted.

Figure 8A:
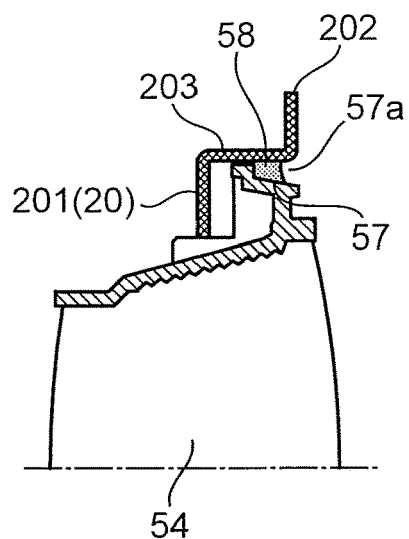
FIG. 8A is a sectional view showing a positional relationship of the frame supporting portion and the fourth lens group holding frame.
Figure 8B:
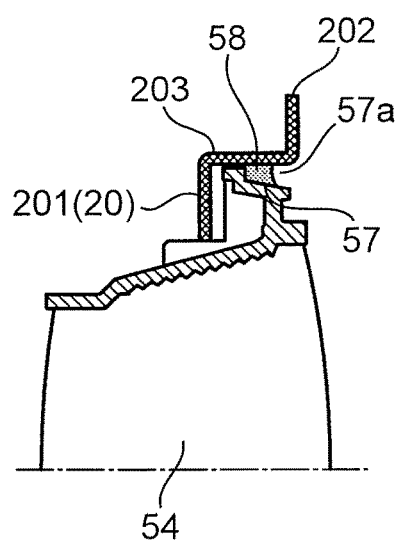
FIG. 8B is a sectional view of a state attained when the frame supporting portion moves toward an object side relative to the fourth lens group holding frame from a state shown in FIG. 8A.
Figure 8C:
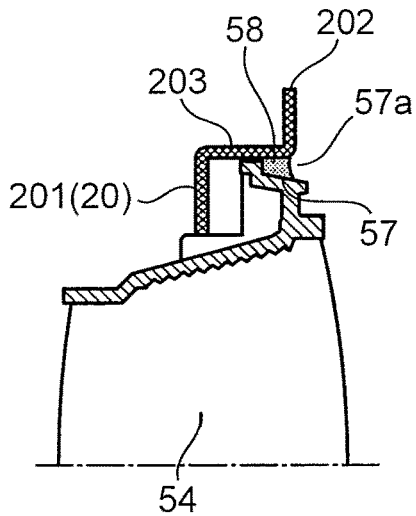
FIG. 8C is a sectional view of a state attained when the frame supporting portion moves toward an image side relative to the fourth lens group holding frame from the state shown in FIG. 8A.

At that time, even if the fourth lens group 54 moves in the optical axis direction relative to the frame supporting portion 20 of the fixing cylinder and the adhesive portions 57 move in the optical axis direction, the adhesive portions 57 do not become shallower and a fixed amount of the adhesive is constantly filled since a length of the coupling portions 203 of the frame supporting portion 20 covering the adhesive portions 57 in the optical axis direction is larger than a depth of the adhesive portions 57. For example, even if the fourth lens group 54 moves toward the object side relative to the frame supporting portion 20 as shown in FIG. 8B or moves toward the image side relative to the frame supporting portion 20 as shown in FIG. 8C from a state shown in FIG. 8A, the depth of the adhesive portions 57 remains unchanged. This causes the fourth lens group holding frame 5*d* and the frame supporting portion 20 of the fixing cylinder to be firmly bonded. FIG. 8A is a sectional view showing a positional relationship of the frame supporting portion and the fourth lens group holding frame. FIG. 8B is a sectional view of a state attained when the frame supporting portion moves toward the object side relative to the fourth lens group holding frame from the state shown in FIG. 8A. FIG. 8C is a sectional view of a state attained when the frame supporting portion moves toward the image side relative to the fourth lens group holding frame from the state shown in FIG. 8A.

Thereafter, the cover member 9 is mounted on the opening portion 82 of the mount member 8. The adjusters 56 are covered by the cover member 9 when viewed in the optical axis direction with the cover member 9 mounted, thereby reducing a possibility of erroneous operation of the engaging members 562 by a user or the like. At that time, the cover member 9 has weaker component strength than the mount member 8 due to its material and shape, and the mount member is not deformed by the mounting of the cover member 9. In this embodiment, the mount member 8 is formed of a metal material, whereas the cover member 9 is formed of a resin material and thin, wherefore the cover member 9 is lower in strength than the mount member 8. On the mount member 8, a mounted position of the cover member 9 is distant from a mounting portion of the reinforcing member 4 and the reinforcing member 4 is not deformed by the mounting of the cover member 9. Thus, even if the cover member 9 is mounted on the mount member 8 after the adjusters 56 are adjusted, a possibility of misalignment caused by the mounting of the cover member 9 is low.

The lens barrel 1 thus configured is used by being mounted on the camera main body such that a part of the camera main body is in contact with the reference surface 81 of the mount member 8. In the lens barrel 1 mounted on this camera main body in this way, the orientation (inclination) of the optical axis in the fourth lens group 54 held in the fourth lens group holding frame 5*d* and the position of the fourth lens group 54 in the optical axis direction are adjusted on the basis of the reference surface 81 of the mount member 8. Thus, the lens groups of the lens barrel 1 are precisely positioned with respect to an imaging element and the like provided in the camera main body. Although the adjustment is made on the basis of the reference portion of the mount member to reduce an adjustment error of the optical element with respect to the camera main body in this embodiment, the position of the optical element may be adjusted on the basis of a part of the fixing cylinder depending on the configuration. An adjustment reference in that case is preferably a part with a small error with respect to the reference portion of the mount member.

Note that although the adhesive portions 57 are arranged adjacent to both ends of the adjusters 56 in the circumferential direction of the frame main body portion 55 in the above first embodiment, there is no limitation to such a mode. For example, the adhesive portion 57 may be formed on any one of the one and other sides of the adjuster 56 in the circumferential direction of the frame main body portion 55 and an outer side of the adjuster 56 in the radial direction of the frame main body portion 55 and the position thereof can be appropriately changed. Further, the adhesive portion 57 may be formed not only on the circumferential side surface, but also on an outer or inner radial side of the adjuster. However, it is effective for the fixing of the adjuster that the adhesive portion is located as close to the adjuster as possible.

Figure 9:
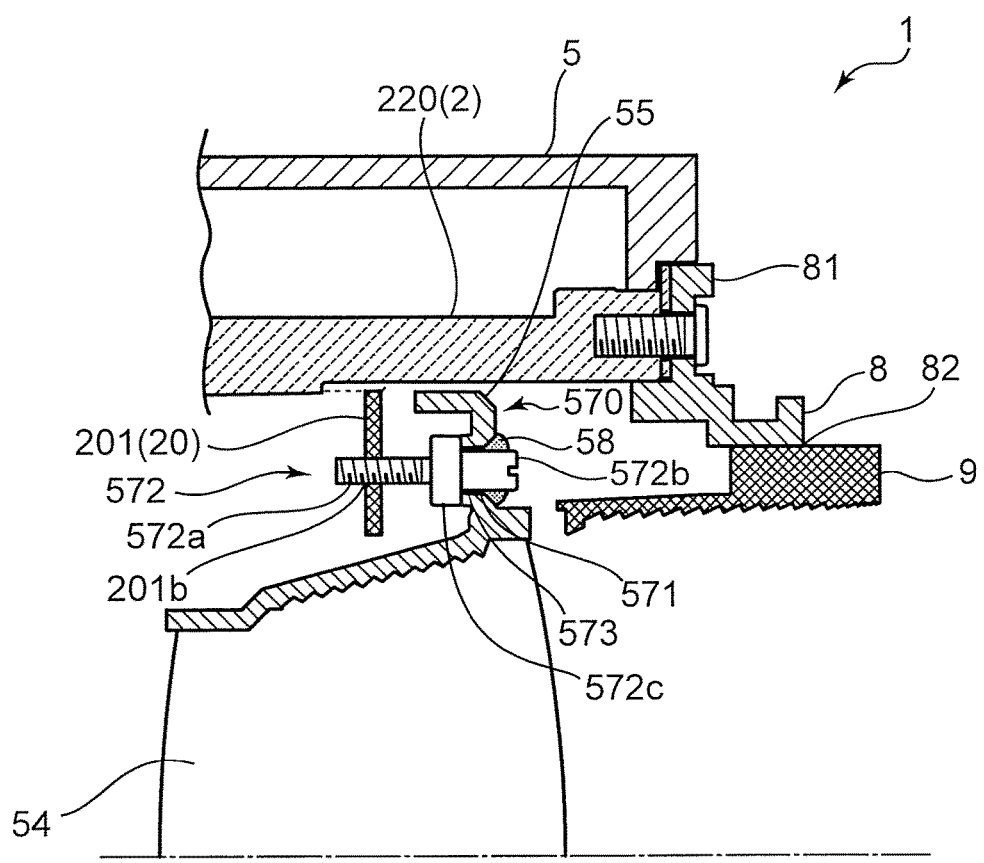
FIG. 9 is an enlarged half sectional view of an essential part of a modification of the lens barrel in the first embodiment.
Figure 10:
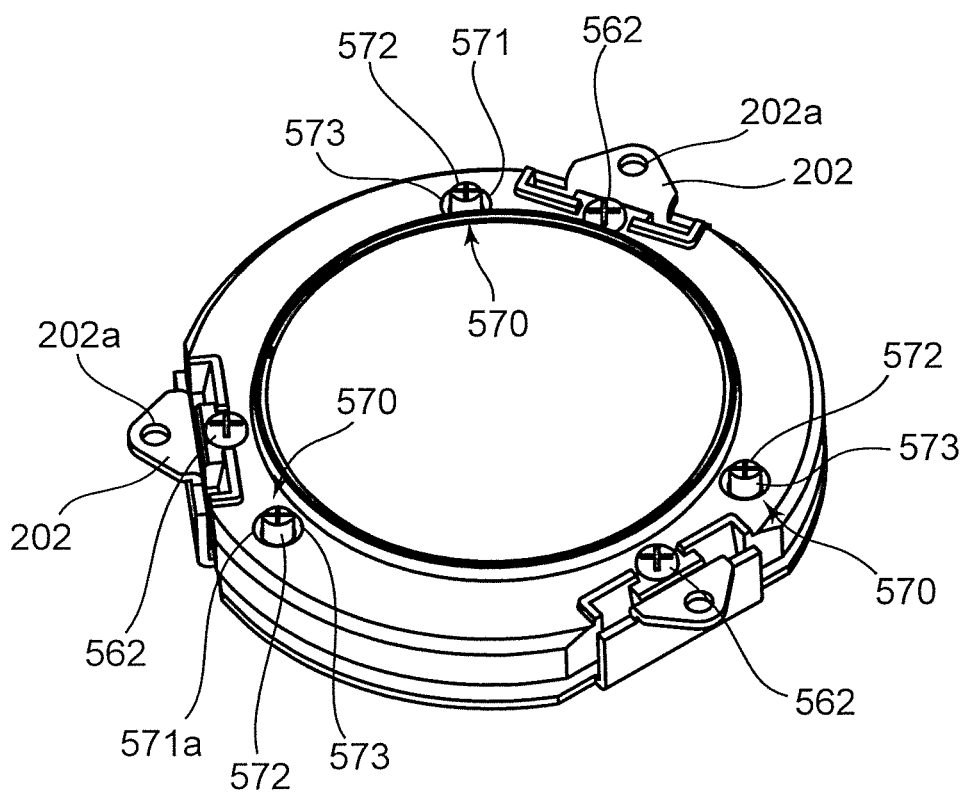
FIG. 10 is a perspective view of a state where a fourth lens group holding frame and a frame supporting portion of the lens barrel shown in FIG. 9 are assembled.
Figure 11:
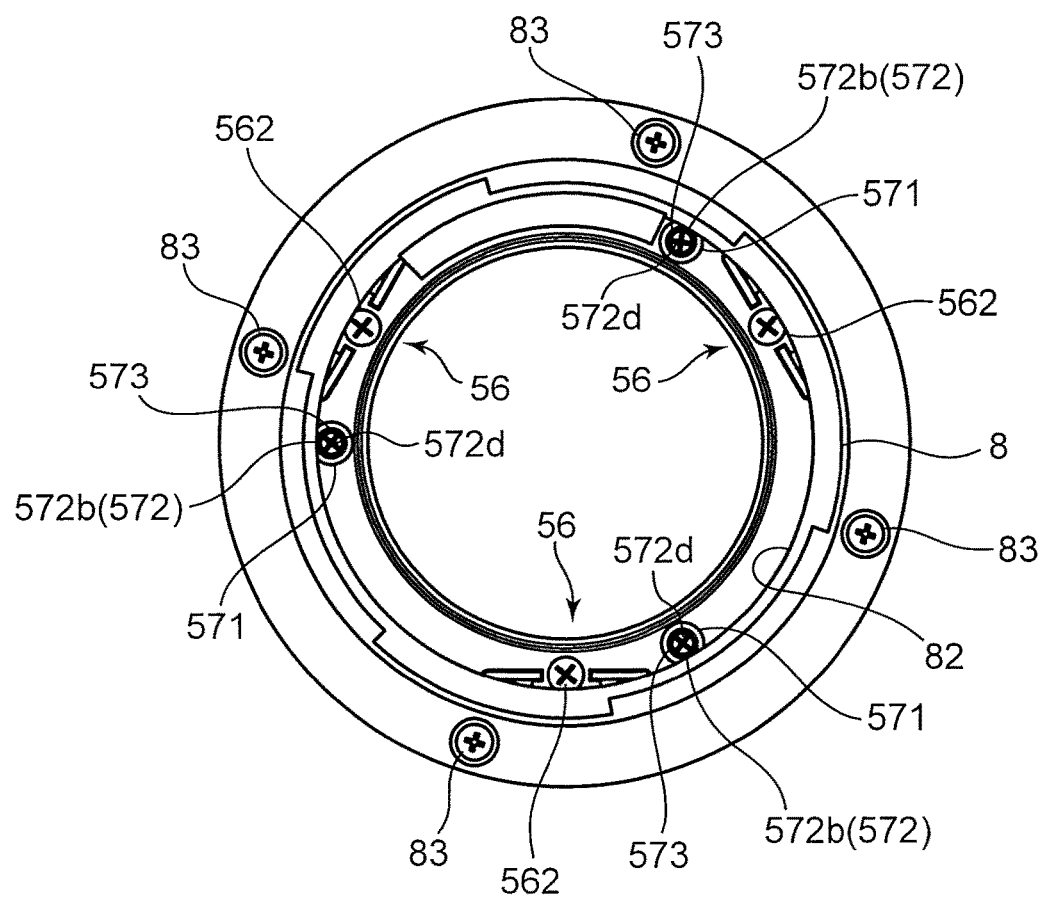
FIG. 11 is a view of an opening portion of a mount member of the lens barrel shown in FIG. 9 when viewed in an optical axis direction.
Figure 12A:
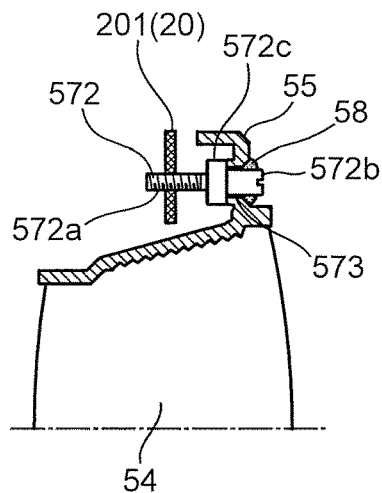
FIG. 12A is a sectional view showing a positional relationship of the frame supporting portion and the fourth lens group holding frame of the lens barrel shown in FIG. 9.
Figure 12B:
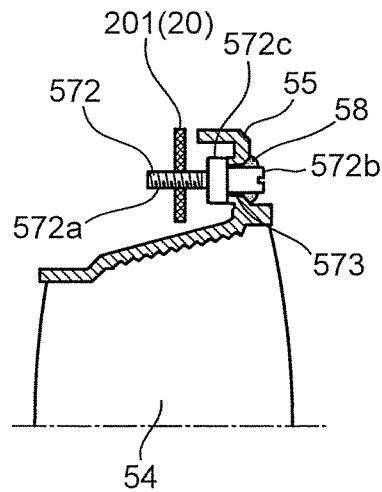
FIG. 12B is a sectional view of a state attained when the frame supporting portion moves toward an object side relative to the fourth lens group holding frame from a state shown in FIG. 12A.
Figure 12C:
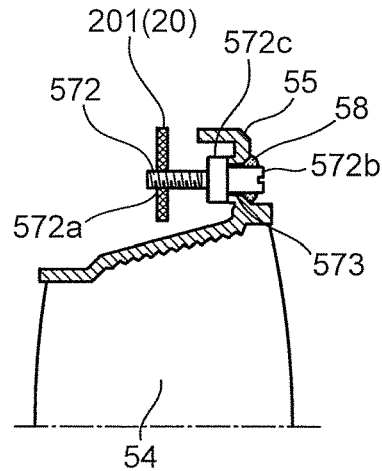
FIG. 12C is a sectional view of a state attained when the frame supporting portion moves toward an image side relative to the fourth lens group holding frame from the state shown in FIG. 12A.

The adhesive portion 57 may be formed at a position at a predetermined distance from the adjuster 56 in the circumferential direction of the frame main body portion 55. A frame body fixing method is not only bonding, but also another method. The frame body may be fixed by shaft members 572, for example, as shown in FIGS. 9 to 12 (FIGS. 12A to 12C). FIG. 9 is an enlarged half sectional view of an essential part of a modification of the lens barrel in the first embodiment. FIG. 10 is a perspective view of a state where a fourth lens group holding frame and a frame supporting portion of the lens barrel shown in FIG. 9 are assembled. FIG. 11 is a view of an opening portion of a mount member of the lens barrel shown in FIG. 9 when viewed in an optical axis direction. FIG. 12A is a sectional view showing a positional relationship of the frame supporting portion and the fourth lens group holding frame of the lens barrel shown in FIG. 9. FIG. 12B is a sectional view of a state attained when the frame supporting portion moves toward an object side relative to the fourth lens group holding frame from a state shown in FIG. 12A. FIG. 12C is a sectional view of a state attained when the frame supporting portion moves toward an image side relative to the fourth lens group holding frame from the state shown in FIG. 12A. More specifically, for example, as shown in FIGS. 9 to 12, frame body fixing portions 570 include shaft receiving holes 571 formed at positions at a predetermined distance from the adjusters 56 in the circumferential direction of the frame main body portion 55 (three positions equally spaced apart in the circumferential direction in this embodiment) and the shaft members 572 inserted into the shaft receiving holes 571.

The shaft member 572 includes an externally threaded portion 572a threadably engaged with the shaft member screw hole 201b provided on the frame supporting portion main body 201 of the frame supporting portion 20 on an object side in the axial direction. The shaft member 572 includes a receiving shaft portion 572b to be inserted into the shaft receiving hole 571 on an image side in the axial direction and, on an end, an operating portion 572d (see FIG. 11) for rotating the engaging member 562 by being disengageably engaged with a tool. This operating portion 572d is located radially inwardly of the opening portion 82 of the mount member 8 when viewed from the image side in the optical axis direction as shown in FIG. 11 and operable from the opening portion 82 of the mount member 8.

This receiving shaft portion 572b has an outer diameter smaller than an inner diameter of the shaft receiving hole 571, the shaft member 572 is guided by inserting the receiving shaft portion 572b into the shaft receiving hole 571, and the receiving shaft portion 572b is formed with a filler receiving portion 573, into which the adhesive 58 is filled for the purpose of preventing the loosening of the externally threaded portion 572a after the position adjustment of the shaft member 572, over the entire circumference between the outer periphery of the receiving shaft portion 572b and the inner periphery of the shaft receiving hole 571.

The shaft member 572 includes a frame main body contact portion 572c, which comes into contact with the frame main body portion 55, between the externally threaded portion 572a and the receiving shaft portion 572b in the axial direction. The frame main body contact portion 572c is in contact with a peripheral edge part of the shaft receiving hole 571 on an object side of the frame main body portion 55, whereby the frame body is held not to move toward the object side relative to the frame body holding portion and the filler receiving portion 573 is closed from the object side.

In the shaft member 572 thus configured, the externally threaded portion 572a is threadably engaged with the shaft member screw hole 201b of the frame supporting portion main body 201, the receiving shaft portion 572b is inserted into the shaft receiving hole 571 from the object side, and the frame main body portion 55 is retracted toward the object side to be movable in the optical axis direction at the time of adjusting the frame body. By rotating and moving the shaft member 572 toward the image side after the adjustment, the frame body contact portion 572c is brought into contact with the frame main body portion 55 and the frame body is held not to move toward the object side. Since a movement toward the image side is regulated by the contact of the head portions 562 of the engaging members 562 in the frame main body portion, the frame body can be fixed in the optical axis direction by regulating a movement toward the object side by the shaft members. With the frame main body contact portions 572c held in contact with the peripheral edge parts of the shaft receiving holes 571 of the frame main body portion 55, the adhesive 58 is filled into the filler receiving portions 573 to prevent the loosening of the shaft members and the head portions 562d are bonded not to rotate relative to the frame supporting portion main body 201 also for the engaging members 562. Also in this case, the filler receiving portions 573 are located radially inwardly of the opening portion 82 of the mount member 8 when viewed from the image side in the optical axis direction as shown in FIG. 11 and the adhesive 58 can be filled into the filler receiving portions 573 from the opening portion 82 of the mount member 8.

Figure 13:
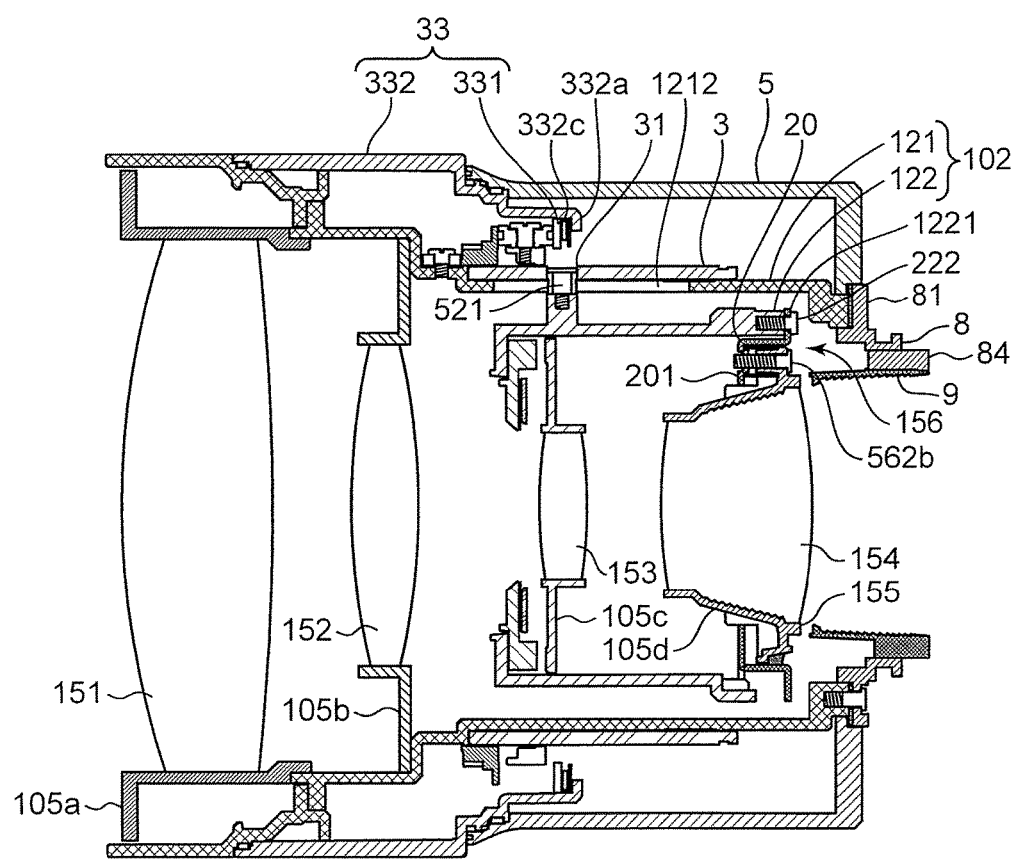
FIG. 13 is a sectional view of a lens barrel in a second embodiment.
Figure 14:
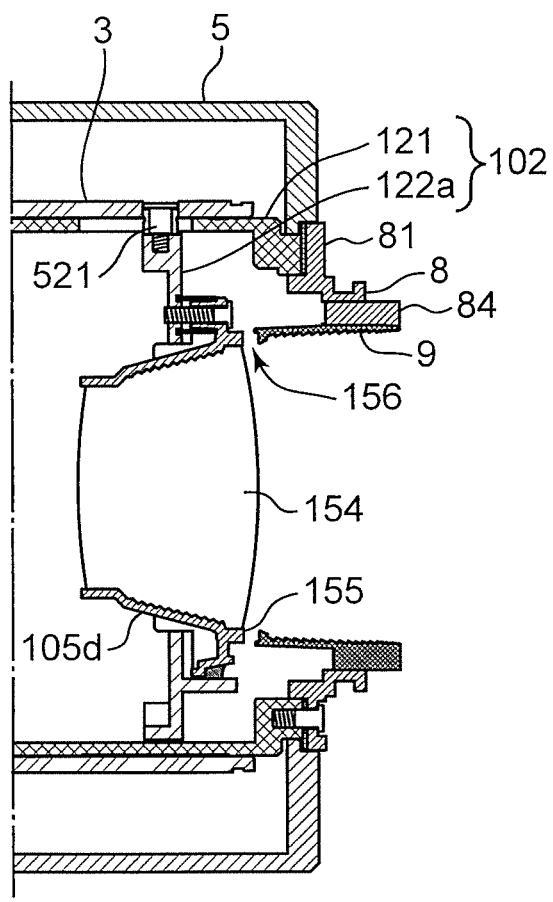
FIG. 14 is a sectional view of an essential part of a modification of the lens barrel of the second embodiment shown in FIG. 13.

Next, a lens barrel 100 of a second embodiment is described based on FIGS. 13 and 14. FIG. 13 is a sectional view of the lens barrel in the second embodiment. FIG. 14 is a sectional view of an essential part of a modification of the lens barrel of the second embodiment shown in FIG. 13.

The lens barrel 100 of the second embodiment includes a frame body holding member 102, 20, a cam cylinder 3, a mount member (mounting member) 8, a cover member 9 and lens group holding frames 105a to 105d holding lens groups 151 to 154 as in the first embodiment described above. The cam cylinder 3, the mount member 8 and the cover member 9 have the same configurations as those in the previous first embodiment.

Although the frame body holding member includes a holding member main body 102 and a frame supporting portion 20 as in the previous first embodiment, the holding member main body 102 of this second embodiment includes one tubular fixing cylinder 121 and a tubular moving frame 122 held in the fixing cylinder 121 movably in an optical axis direction.

The moving frame 122 includes, on the outer periphery, guiding shafts 521 movably inserted in a guide groove 1212 of the fixing cylinder 121 and a cam groove 31 of the cam cylinder 3 similarly to the second lens group holding frame 5b of the previous first embodiment, and these guiding shafts 521 are guided and moved along the guide groove 1212 and the cam groove 31 with the rotation of the cam cylinder 3, whereby the moving frame 122 moves in the optical axis direction.

More specifically, the cam cylinder 3 is rotated by a rotating member with a manual operating member 33, an autofocus operating member 34 and an output ring 35 similarly to the one of the previous first embodiment, and the moving frame 122 moves in the optical axis direction with that rotation of the cam cylinder 3. Note that the manual operating member 33, the autofocus operating member 34 and the output ring 35 have the same configurations as in the previous first embodiment.

The moving frame 122 includes a frame mounting portion 1221, on which the frame supporting portion 20 is to be mounted, on an image-side end surface in an axial direction. In this embodiment, the frame mounting portion 1221 is a screw hole with which a mounting bolt 222 is threadably engaged. The frame supporting portion 20 is mounted on this frame mounting portion 1221 via the mounting bolt 222. Thus, although the frame supporting portion 20 is fixedly mounted on the fixing cylinder in the previous first embodiment, the frame supporting portion 20 is fixedly mounted on the moving frame 122 in this second embodiment.

The first lens group holding frame 105a holds the first lens group 151 including one or more lenses (optical element) and is fixedly held in the fixing cylinder 121.

The second lens group holding frame 105b holds the second lens group 152 including one or more lenses (optical element) and is fixedly held in the fixing cylinder 121.

The third lens group holding frame 105c holds the third lens group 153 including one or more lenses and is fixedly held in the moving frame 122.

The fourth lens group holding frame (frame body) 105d includes a tubular frame main body portion 155 holding the fourth lens group 154 including one or more lenses and adjusters 156 for adjusting the inclination of an optical axis direction in the fourth lens group 154 and the position of the fourth lens group 154 in the optical axis direction. The frame main body portion 155 and the adjusters 156 have the same configurations as in the previous first embodiment.

Note that although the moving frame 122 of this embodiment is composed of a hollow cylindrical body, it can be appropriately changed without limitation to this form. For example, a moving frame 122a may be a plate-like annular body as shown in FIG. 14.

Although the moving frame 122 of this embodiment is movably held by the three guiding shafts 521, the moving frame 122 may be movably held by a helicoid or the like and can be appropriately changed without limitation to this form.

The specification discloses the aforementioned arrangements. The following is a summary of the primary arrangements of the embodiments.

A lens barrel according to one aspect includes a frame body for holding an optical element, a frame body holding member holding the frame body and a mounting member arranged on an object side or an image side of the frame body, mounted on the frame body holding member and having a reference portion on which another member is to be mounted. The mounting member includes an opening portion open to penetrate from the object side to the image side, the frame body includes an adjuster for adjusting the position of the frame body with respect to a predetermined axis of the frame body holding member to adjust at least one of the orientation of an optical axis of the optical element and the position of the optical element in a direction of the optical axis, and the adjuster is arranged at a position adjustable from the opening portion.

According to this configuration, the position of the optical element with respect to the frame body holding member is adjusted by adjusting the adjuster from the opening portion of the mounting member with the mounting member mounted. This can prevent a displacement of the optical element with respect to the frame body holding member such as due to a distortion of a component caused by the mounting of the mounting member and enables the position of the optical element to be adjusted with high accuracy. Thus, the position of the optical element is precisely adjusted with respect to the other member mounted on the basis of the reference portion of the mounting member.

In another aspect, in the above lens barrel, the adjuster includes an engaging member engaged with the frame body holding member, the frame body holding member includes a holding member main body and a frame supporting portion mounted on the holding member main body and supporting the frame body, the frame supporting portion includes a frame supporting portion main body and a main body mounting portion for mounting the frame supporting portion on the holding member main body, the frame supporting portion main body includes an engaged portion with which the engaging member is engaged movably in the optical axis direction, and the engaged portion is formed at a position where the deformation of the frame supporting portion main body with respect to the main body mounting portion caused by engagement with the engaging member is hard to occur.

According to this configuration, the deformation of the frame supporting portion main body with respect to the main body mounting portion is hard to occur and the position of the optical element can be adjusted with higher accuracy.

In another aspect, in the above lens barrel, the engaged portion is formed at a position on an extension line extending from a center of the frame supporting portion main body to the main body mounting portion when viewed in the optical axis direction.

According to this configuration, the deformation of the frame supporting portion main body with respect to the main body mounting portion is harder to occur and the position of the optical element can be adjusted with higher accuracy.

In another aspect, in these above lens barrels, the frame supporting portion includes a coupling portion coupling the frame supporting portion main body and the main body mounting portion spaced apart from each other in the optical axis direction, and the frame supporting portion main body is formed to have a size insertable into an inner peripheral side of the holding member main body.

According to this configuration, the frame supporting portion main body can be arranged at the inner peripheral side of the holding member main body, the frame supporting portion is efficiently arranged and the miniaturization of the lens barrel is realized.

In another aspect, in these above lens barrels, the frame body includes an adhesive portion arranged adjacent to the adjuster at least at one position out of one and the other side parts of the adjuster in a circumferential direction of the frame body and an outer side of the adjuster in a radial direction of the frame body to bond the frame body holding member and the frame body.

According to this configuration, a possibility of misalignment is reduced even if an impact is applied after the adjustment or a possibility of separating the fixed frame supporting portion and frame body is reduced.

In another aspect, in the above lens barrel, the adhesive portion includes an adhesive filling portion for filling an adhesive, the adhesive filling portion is formed by recessing a part of the frame body radially inwardly, and the coupling portion is arranged on a radially outer side of the adhesive filling portion in the frame body to close the radial outer side.

According to this configuration, the adhesive can be applied between the frame body and the frame body holding member and high adhesion strength is obtained. A fixed amount of the adhesive can be applied regardless of the position of the frame body and a stable adhesive force is obtained.

In another aspect, in the above lens barrel, the adhesive filling portion is arranged to be able to fill the adhesive from the opening portion.

According to this configuration, the adhesive can be applied without detaching the mounting member, the deformation of the member caused by the attachment and detachment of the mounting member is reduced and high adjustment accuracy is obtained.

In another aspect, in these above lens barrels, the coupling portion is arranged at least at three positions in a circumferential direction of the frame supporting portion main body and each coupling portion extends along the optical axis direction and is arranged radially outwardly of the frame body.

According to this configuration, the frame supporting portion can be reduced in weight, space saving can be realized and the enlargement of a product can be prevented.

In another aspect, in these above lens barrels, the frame body holding member includes a fixing cylinder and the frame body is held in the fixing cylinder.

According to this configuration, the adjuster is adjusted from the opening portion of the mounting member with the mounting member mounted to adjust the position of the optical element with respect to the fixing cylinder. This can prevent a displacement of the optical element with respect to the fixing cylinder such as due to a distortion of the component caused by the mounting of the mounting member and adjust the position of the optical element with high accuracy.

In another aspect, in these above lens barrels, the frame body holding member includes a fixing cylinder and a moving frame held in the fixing cylinder movably in the optical axis direction, and the frame body is held in the moving frame.

According to this configuration, the position of the optical element with respect to the moving frame holding the frame body is adjusted. This can prevent a displacement of the optical element with respect to the moving frame such as due to a distortion of the component caused by the mounting of the mounting member and adjust the position of the optical element with high accuracy even when the frame body is held in the moving frame.

In another aspect, in these above lens barrels, a cover member is further provided which is mounted on the mounting member to close a part of the opening portion, and the adjuster is covered by the cover member when viewed in the optical axis direction.

According to this configuration, the adjuster is not exposed from the opening portion, a possibility of erroneous operation such as by a user is reduced and high quality of the lens barrel can be maintained. Since the cover member is mounted on the mounting member, there is a reduced possibility of misalignment caused by the mounting of the cover member even if the cover member is mounted on the mounting member after the adjuster is adjusted.

In another aspect, in these above lens barrels, the mounting member is a mount member for detachably mounting a camera main body.

According to this configuration, it is possible to adjust the adjuster from the opening of the mount member with the mount member mounted, adjust the position of the optical element with respect to the frame body holding member, prevent a displacement of the optical element due to a distortion of the component caused by the mounting of the mount member and an error of the mount member itself and adjust the position of the optical element with high accuracy. Thus, the position of the optical element with respect to the camera main body mounted, for example, on the basis of the reference portion of the mount member is precisely adjusted.

This application is based on Japanese Patent Application No. 2015-8525 filed on Jan. 20, 2015, the contents of which are hereby incorporated by reference.

To express the present invention, the present invention has been appropriately and sufficiently described through the embodiment with reference to the drawings above. However, it should be recognized that those skilled in the art can easily modify and/or improve the embodiments described above. Therefore, it is construed that modification and improvements made by those skilled in the art are included within the scope of the appended claims unless those modifications and improvements depart from the scope of the appended claims.

The invention claimed is:
1. A lens barrel, comprising:
a frame body for holding an optical element;
a frame body holding member holding the frame body; and
a mounting member arranged on an object side or an image side of the frame body, mounted on the frame body holding member and having a reference portion on which another member is to be mounted,
wherein the mounting member includes an opening portion open to penetrate from the object side to the image side,
wherein the frame body includes a frame main body portion for holding the optical element, and adjusters arranged at positions spaced apart from each other in a circumferential direction of the frame main body portion for adjusting the position of the frame body with respect to a predetermined axis of the frame body holding member to adjust the orientation of an optical axis in the optical element and the position of the optical element in a direction of the optical axis,
wherein the adjusters are arranged at respective positions that are each adjustable from the opening portion, each of the adjusters including a biasing member for biasing the frame main body portion toward the image side in the optical axis direction, and a bolt-like engaging member held in the frame main body portion and being operable from the opening portion for moving the frame main body portion toward an object side of the optical axis direction against biasing force provided by the biasing member,
wherein the frame body holding member includes main body mounting pieces, each main body mounting piece being configured to receive a respective bolt-like engaging member, the main body mounting pieces being fixed to the frame body holding member.

2. The lens barrel of claim 1,
wherein the adjuster includes an engaging member engaged with the frame body holding member,
wherein the frame body holding member includes a holding member main body and a frame supporting portion mounted on the holding member main body and supporting the frame body,
wherein the frame supporting portion includes a frame supporting portion main body and a main body mounting portion for mounting the frame supporting portion on the holding member main body, wherein the frame supporting portion main body includes an engaged portion with which the engaging member is engaged movably in the optical axis direction, and wherein the engaged portion is formed at a position where the deformation of the frame supporting portion main body with respect to the main body mounting portion caused by engagement with the engaging member is hard to occur.

3. The lens barrel of claim 2, wherein the engaged portion is formed at a position on an extension line extending from a center of the frame supporting portion main body to the main body mounting portion when viewed in the optical axis direction.

4. The lens barrel of claim 2, wherein the frame supporting portion includes a coupling portion coupling the frame supporting portion main body and the main body mounting portion spaced apart from each other in the optical axis direction, and wherein the frame supporting portion main body is formed to have a size insertable into an inner peripheral side of the holding member main body.

5. The lens barrel of claim 4, wherein the coupling portion is arranged at least at three positions in a circumferential direction of the frame supporting portion main body, and wherein each coupling portion extends along the optical axis direction and is arranged radially outwardly of the frame body.

6. The lens barrel of claim 1, wherein the frame body includes an adhesive portion arranged adjacent to the adjuster at least at one position out of one and the other side parts of the adjuster in a circumferential direction of the frame body and an outer side of the adjuster in a radial direction of the frame body to bond the frame body holding member and the frame body.

7. The lens barrel of claim 1, wherein the frame body holding member includes a fixing cylinder and the frame body is held in the fixing cylinder.

8. The lens barrel of claim 1, wherein the frame body holding member includes a fixing cylinder and a moving frame held in the fixing cylinder movably in the optical axis direction, and wherein the frame body is held in the moving frame.

9. The lens barrel of claim 1, further comprising a cover member mounted on the mounting member to close a part of the opening portion, wherein the adjuster is covered by the cover member when viewed in the optical axis direction.

10. The lens barrel of claim 1, wherein the mounting member is a mount member for detachably mounting a camera main body.

11. A lens barrel according to claim 1, wherein:

the frame main body portion includes a cylindrical biasing member inserting portion having such a diameter as to be insertable into the inner periphery of the biasing member and projecting toward the object side from the frame main body portion.

12. A lens barrel according to claim 1, wherein:

a mechanical contact position on an adjustment range end is disposed on the axis of the bolt-like engaging member.

13. A lens barrel comprising:

a frame body for holding an optical element;

a frame body holding member holding the frame body; and a mounting member arranged on an object side or an image side of the frame body, mounted on the frame body holding member and having a reference portion on which another member is to be mounted, wherein the mounting member includes an opening portion open to penetrate from the object side to the image side, wherein the frame body includes an adjuster for adjusting the position of the frame body with respect to a predetermined axis of the frame body holding member to adjust at least one of the orientation of an optical axis in the optical element and the position of the optical element in a direction of the optical axis, wherein the adjuster is arranged at a position adjustable from the opening portion, wherein the frame body includes an adhesive portion arranged adjacent to the adjuster at least at one position out of one and the other side parts of the adjuster in a circumferential direction of the frame body and an outer side of the adjuster in a radial direction of the frame body to bond the frame body holding member and the frame body, wherein the adhesive portion includes an adhesive filling portion for filling an adhesive, wherein the adhesive filling portion is formed by recessing a part of the frame body radially inwardly, and wherein the coupling portion is arranged on a radially outer side of the adhesive filling portion in the frame body to close the radial outer side.

14. The lens barrel of claim 13, wherein the adhesive filling portion is arranged to be able to fill the adhesive from the opening portion.

15. A lens barrel comprising:

a frame body for holding an optical element;

a frame body holding member holding the frame body; and a mounting member arranged on an object side or an image side of the frame body, mounted on the frame body holding member and having a reference portion on which another member is to be mounted, wherein the mounting member includes an opening portion open to penetrate from the object side to the image side, wherein the frame body includes a frame main body portion for holding the optical element, and adjusters arranged at positions spaced apart from each other in a circumferential direction of the frame main body portion for adjusting the position of the frame body with respect to a predetermined axis of the frame body holding member to adjust the orientation of an optical axis in the optical element and the position of the optical element in a direction of the optical axis, wherein the adjusters are arranged at respective positions that are each adjustable from the opening portion, each of the adjusters including a biasing member for biasing the frame main body portion toward the image side in the optical axis direction, and a bolt-like engaging member held in the frame main body portion and being operable from the opening portion for moving the frame main body portion toward an object side of the optical axis direction against biasing force provided by the biasing member, wherein the frame body includes an adhesive portion arranged adjacent to the adjuster at least at one position out of one and the other side parts of the adjuster in a circumferential direction of the frame body and an outer side of the adjuster in a radial direction of the frame body to bond the frame body holding member and the frame body, wherein the adhesive portion includes an adhesive filling portion for filling an adhesive, wherein the adhesive filling portion is formed by recessing a part of the frame body radially inwardly, and wherein the coupling portion is arranged on a radially outer side of the adhesive filling portion in the frame body to close the radial outer side.

16. The lens barrel of claim 15, wherein the adhesive filling portion is arranged to be able to fill the adhesive from the opening portion.

* * * * *